US012142203B2

(12) United States Patent
Kim

(10) Patent No.: US 12,142,203 B2
(45) Date of Patent: Nov. 12, 2024

(54) DISPLAY DEVICE INCLUDING TIMING CONTROLLER THAT ESTIMATES TEMPERATURE USING ON-PIXEL RATIO AND METHOD OF DRIVING THE SAME

(71) Applicant: Samsung Display Co., Ltd., Yongin-Si (KR)

(72) Inventor: Min Weun Kim, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/146,273

(22) Filed: Dec. 23, 2022

(65) Prior Publication Data

US 2023/0230541 A1 Jul. 20, 2023

(30) Foreign Application Priority Data

Jan. 17, 2022 (KR) ........................ 10-2022-0006761

(51) Int. Cl.
*G09G 3/3208* (2016.01)

(52) U.S. Cl.
CPC ... *G09G 3/3208* (2013.01); *G09G 2300/0842* (2013.01); *G09G 2310/0272* (2013.01); *G09G 2310/08* (2013.01); *G09G 2320/041* (2013.01); *G09G 2320/0673* (2013.01); *G09G 2360/16* (2013.01)

(58) Field of Classification Search
CPC ......... G09G 3/3233; G09G 2300/0426; G09G 2300/0819; G09G 2300/0852; G09G 2310/08; G09G 2320/0233; G09G 2320/041; G09G 2320/045; G09G 2330/028
See application file for complete search history.

(56) References Cited

U.S. PATENT DOCUMENTS

| | | | | |
|---|---|---|---|---|
| 7,696,977 B2 | 4/2010 | Lee et al. | | |
| 9,564,084 B2 | 2/2017 | Park | | |
| 2012/0249619 A1* | 10/2012 | Furukawa | G09G 3/3648 | 345/691 |
| 2013/0016138 A1* | 1/2013 | Sasaki | G09G 3/3648 | 345/204 |
| 2015/0062187 A1* | 3/2015 | Park | G09G 3/3225 | 345/63 |

(Continued)

FOREIGN PATENT DOCUMENTS

| | | | | |
|---|---|---|---|---|
| KR | 10-0734311 B1 | | 7/2007 | |
| KR | 1020170107597 A | * | 9/2017 | H04N 9/64 |

(Continued)

*Primary Examiner* — Kwang-Su Yang
(74) *Attorney, Agent, or Firm* — Innovation Counsel LLP

(57) ABSTRACT

A display device is disclosed that includes a display panel, a timing controller, and a data driver. The display panel includes a plurality of pixels. The timing controller is configured to calculate an on-pixel ratio of first image data and correct the first image data into second image data based on the on-pixel ratio. The data driver is configured to generate a data signal based on the second image data and provide the data signal to the pixels. The timing controller calculates the second image data by estimating a temperature of the display panel using the on-pixel ratio and gamma-correcting the first image data in response to the temperature.

16 Claims, 6 Drawing Sheets

(56) References Cited

U.S. PATENT DOCUMENTS

| | | | | |
|---|---|---|---|---|
| 2015/0161941 A1* | 6/2015 | Lim | G09G 3/3208 345/691 |
| 2019/0064892 A1* | 2/2019 | Kim | G06F 1/206 |
| 2019/0266941 A1* | 8/2019 | Pyo | G09G 3/3225 |
| 2020/0051557 A1* | 2/2020 | Shin | G10L 15/26 |
| 2021/0012705 A1* | 1/2021 | Pyun | G09G 3/32 |
| 2021/0034101 A1* | 2/2021 | Yildiz | G06F 1/203 |

FOREIGN PATENT DOCUMENTS

| | | | |
|---|---|---|---|
| KR | 10-2017-0136112 | A | 12/2017 |
| KR | 10-2034062 | B1 | 10/2019 |
| KR | 10-2113109 | B1 | 5/2020 |

* cited by examiner

FIG. 4B

| GRAYSCALE | Rc | Gc | Bc |
|---|---|---|---|
| ... | ... | ... | ... |
| n | n+ ΔRGn | n+ ΔGGn | n+ ΔBGn |
| ... | ... | ... | ... |

<LUT2>

DISPLAY DEVICE INCLUDING TIMING CONTROLLER THAT ESTIMATES TEMPERATURE USING ON-PIXEL RATIO AND METHOD OF DRIVING THE SAME

CROSS-REFERENCE TO RELATED APPLICATION

This application claims priority under 35 U.S.C. § 119 to Korean Patent Application No. 10-2022-0006761, filed in the Korean Intellectual Property Office on Jan. 17, 2022, the disclosure of which is incorporated by reference in its entirety.

BACKGROUND

1. Technical Field

The present disclosure relates to a display device and a method of driving the same.

2. Description of the Related Art

An organic light emitting display device is one type of a display device that displays an image using an organic light emitting diode (OLED) that generates light by recombination of an electron and a hole.

The organic light emitting display device supplies a driving current of a size corresponding to a data signal to the OLED provided in each of pixels. Then, each OLED emits light with a luminance corresponding to the driving current.

An amount of the driving current flowing through the entire pixel area of the organic light emitting display device varies according to first image data (or input image data). As the amount of the driving current increases, a temperature of the display device may increase. Light characteristic deterioration according to a temperature may occur due to a characteristic of the organic light emitting display device, and thus a light characteristic deviation may occur.

SUMMARY

Embodiments of the present disclosure may provide a display device capable of preventing a light characteristic deviation without a separate temperature sensor.

An embodiment of a display device includes a display panel including a plurality of pixels, a timing controller configured to calculate an on-pixel ratio of first image data and correct the first image data into second image data based on the on-pixel ratio, and a data driver configured to generate a data signal based on the second image data and provide the data signal to the pixels.

The timing controller may calculate the second image data by estimating a temperature of the display panel using the on-pixel ratio and gamma-correcting the first image data in response to the temperature.

The on-pixel ratio may be a ratio of the number of pixels activated based on the first image data to the total number of the pixels included in the display panel.

The timing controller may include an on-pixel ratio calculator configured to calculate the on-pixel ratio using the first image data, and a counter configured to calculate an accumulated value by counting the on-pixel ratio.

The counter may calculate the accumulated value by summing the on-pixel ratio for each frame during a preset period.

The counter may include a buffer that stores the accumulated value, and may initialize the accumulated value stored in the buffer when a black pattern is included in the first image data or when power is turned off.

The counter may stop a count of the on-pixel ratio when the accumulated value corresponds to a preset maximum value.

The counter may estimate the temperature of the display panel corresponding to the accumulated value by using a first lookup table.

The first lookup table may include temperatures of the display panel corresponding to the accumulated value, and the temperature of the display panel may increase linearly or non-linearly in response to the accumulated value.

The timing controller may include a gamma corrector configured to calculate the second image data by using a second lookup table.

The second lookup table may include gamma correction data corresponding to a grayscale for each temperature of the display panel.

The gamma corrector may vary a luminance of the first image data and a color coordinate of the first image data so that the luminance of the first image data and the color coordinate of the first image data are close to a target luminance and a target color coordinate at a specific temperature.

An embodiment of a method of driving a display device, which includes a display panel including a plurality of pixels, a timing controller configured to receive first image data and output corrected second image data, and a data driver configured to generate a data signal based on the second image data and provide the data signal to the pixels, includes calculating an on-pixel ratio using the first image data, calculating an accumulated value by counting the on-pixel ratio, estimating a temperature of the display panel based on the accumulated value, and calculating the second image data by gamma-correcting the first image data according to the temperature of the display panel.

The on-pixel ratio may be a ratio of the number of pixels activated based on the first image data to the total number of the pixels included in the display panel.

Calculating the accumulated value may include calculating the accumulated value by summing the on-pixel ratio for each frame during a preset period.

Calculating the accumulated value may further include initializing the accumulated value when a black pattern is included in the first image data or when power is turned off.

Calculating the accumulated value may further include stopping a count of the on-pixel ratio when the accumulated value corresponds to a preset maximum value.

Estimating the temperature of the display panel may include using a first lookup table, the first lookup table may include temperatures of the display panel corresponding to the accumulated value, and the temperature of the display panel may increase linearly or non-linearly in response to the accumulated value.

Calculating the second image data may include using a second lookup table, and the second lookup table may include gamma correction data corresponding to a grayscale for each temperature of the display panel.

The display device according to an embodiment of the disclosure may prevent a light characteristic deviation without a separate temperature sensor by estimating the temperature of the display panel using an on-pixel ratio OPR of first image data (or input image data) and gamma-correcting the first image data based on the estimated temperature.

However, an effect of the disclosure is not limited to the above-described effect, and may be variously expanded in a range without departing from the spirit and scope of the disclosure.

BRIEF DESCRIPTION OF THE DRAWINGS

The above and other features of the disclosure will become more apparent by describing in further detail embodiments thereof with reference to the accompanying drawings, in which:

FIG. 4B is a second lookup table according to an embodiment; and

DETAILED DESCRIPTION

The advantages and features of the disclosure and a method of achieving them will become apparent with reference to the embodiments described in detail below together with the accompanying drawings. However, the disclosure is not limited to the embodiments disclosed below, and may be implemented in various different forms. The present embodiments are provided so that the disclosure will be thorough and complete and those skilled in the art to which the disclosure pertains can fully understand the scope of the disclosure. The disclosure is only defined by the scope of the claims.

Hereinafter, specific embodiments are described with reference to the accompanying drawings.

Figure 1:
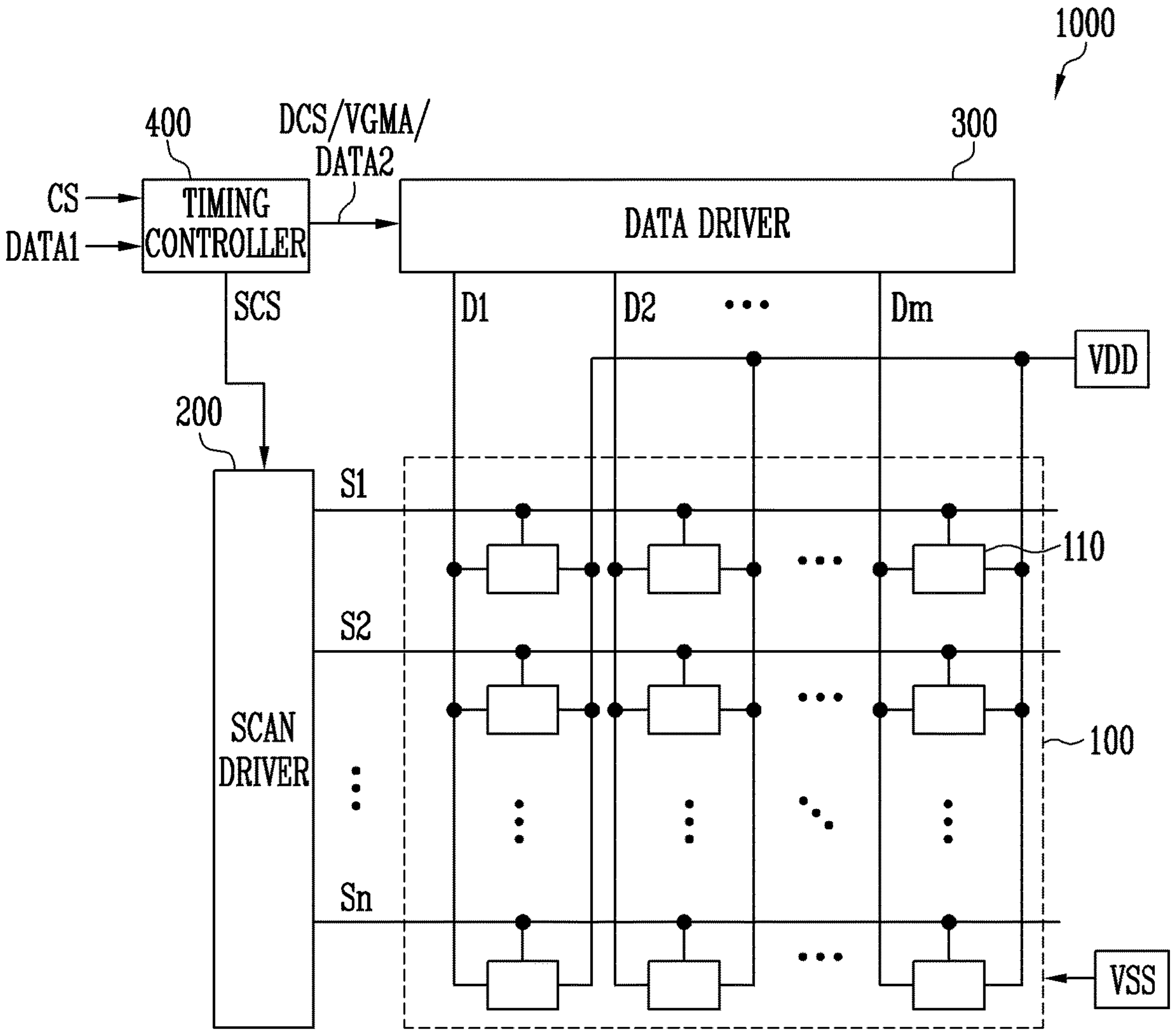
FIG. 1 is a diagram illustrating a display device according to an embodiment of the disclosure.
Figure 2:
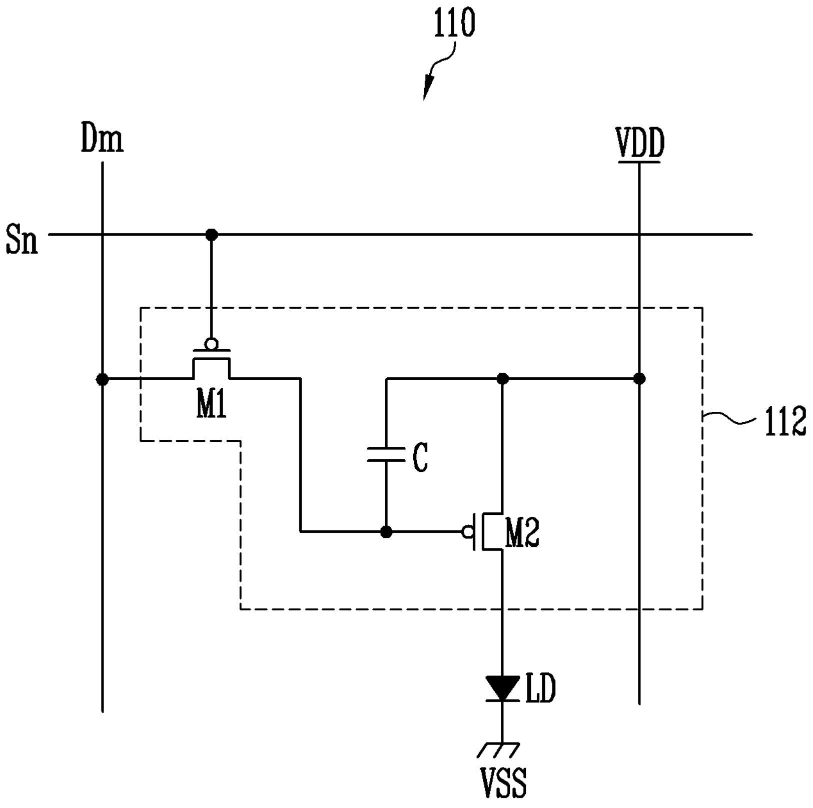
FIG. 2 is a diagram illustrating a pixel according to an embodiment of the disclosure.

FIG. 1 is a diagram illustrating a display device according to an embodiment of the disclosure. FIG. 2 is a diagram illustrating a pixel according to an embodiment of the disclosure. For convenience, in FIG. 2, a pixel connected to an n-th scan line Sn and an m-th data line Dm is shown.

Referring to FIG. 1, the display device 1000 according to an embodiment of the disclosure may include a plurality of pixels 110 disposed on a display panel 100, a scan driver 200 and a data driver 300 for driving the pixels 110, and a timing controller 400 for driving the scan driver 200 and the data driver 300.

The display panel 100 may include scan lines S1 to Sn and data lines D1 to Dm arranged in directions crossing each other, and the plurality of pixels 110 connected to the scan lines S1 to Sn and the data lines D1 to Dm.

Each of the pixels 110 may receive a data signal from a data line (e.g., D1) of a corresponding vertical line when a scan signal is supplied from a scan line (e.g. S1) of a corresponding horizontal line, and emit light with a luminance corresponding to the data signal. Each of the pixels 110 may be configured as shown in FIG. 2 as an example.

Referring to FIG. 2, the pixel 110 according to an embodiment of the disclosure may include a light emitting element LD and a pixel circuit 112 for supplying a driving current to the light emitting element LD.

A first electrode (for example, an anode electrode) of the light emitting element LD may be connected to the pixel circuit 112, and a second electrode (for example, a cathode electrode) may be connected to second power VSS. The second power VSS may be set as low-potential pixel power as an example. The light emitting element LD may emit light with a luminance corresponding to the driving current supplied from the pixel circuit 112.

The pixel circuit 112 may receive the data signal from the data line Dm when the scan signal is supplied from the scan line Sn.

The pixel circuit 112 may control whether or not the driving current is supplied to the light emitting element LD or an amount of the driving current in response to the data signal.

To this end, the pixel circuit 112 may include a first transistor M1, a second transistor M2, and a storage capacitor C.

The first transistor (switching transistor) M1 may be connected between the data line Dm and a first electrode of the storage capacitor C, and a gate electrode of the first transistor M1 may be connected to the scan line Sn. The first transistor M1 may be turned on when the scan signal is supplied from the scan line Sn, to transmit the data signal supplied from the data line Dm to the storage capacitor C. Accordingly, the storage capacitor C may be charged with a voltage corresponding to the data signal.

The second transistor (driving transistor) M2 is connected between the first power VDD and the light emitting element LD, and a gate electrode of the second transistor M2 is connected to the first electrode of the storage capacitor C. The second transistor M2 controls a driving current flowing from the first power VDD to the second power VSS via the light emitting element LD, in response to a voltage supplied to the gate electrode thereof, that is, the voltage corresponding to the data signal. Here, the first power VDD may be set as high-potential pixel power having a potential higher than that of the second power VSS.

Accordingly, the light emitting element LD emits light with a luminance corresponding to the driving current. However, when a data signal corresponding to a black grayscale is supplied, the second transistor M2 may not supply the driving current to the light emitting element LD, and thus the light emitting element LD may not emit light.

The storage capacitor C may store the voltage corresponding to the data signal supplied via the first transistor M1 and maintain the stored voltage until the data signal of a next frame is supplied.

As described above, the pixel 110 receives the data signal for each frame period, and displays a grayscale by emitting light with a luminance corresponding to the received data signal.

The pixel circuit shown in FIG. 2 is exemplary, and a known pixel circuit including additional transistors and capacitors may be applied to the display panel 100.

Referring to FIG. 1 again, the timing controller 400 may rearrange first image data DATA1 input from the outside and supply the first image data DATA1 to the data driver 300. The timing controller 400 may receive the first image data DATA1 from the outside and generate second image data DATA2 corrected to be suitable for image display of the display panel 100.

The timing controller 400 may generate a scan control signal SCS and a data control signal DCS in response to a control signal CS supplied from the outside, and supply the generated scan control signal SCS and data control signal DCS to the scan driver 200 and the data driver 300, respectively. The control signal CS supplied to the timing controller 400 may include a vertical/horizontal synchronization signal, a clock signal, and an enable signal.

The timing controller 400 may supply gamma voltages VGMA to the data driver 300. The gamma voltages VGMA may be used to generate the data signal, and may be a reference voltage of the data signal for a specific grayscale. That is, a voltage of the data signal at a corresponding grayscale may be determined according to the gamma voltage VGMA for each grayscale. Therefore, the gamma voltages VGMA may be a factor that determines a driving current flowing through the pixels 110 and a luminance according thereto. For example, the gamma voltages VGMA for each grayscale may be stored based on a 2.2 gamma curve in which a gamma value is set to 2.2, and may be supplied to the data driver 300.

Meanwhile, for convenience of description, in FIG. 1, the gamma voltages VGMA and the second image data DATA2 are separately indicated, but the disclosure is not limited thereto. For example, after converting the first image data DATA1 by applying the gamma voltages VGMA to the first image data DATA1 in the timing controller 400, the second image data DATA2 to which the gamma voltages VGMA are applied may be supplied to the data driver 300.

Meanwhile, in the light emitting element LD, light characteristic deterioration according to a temperature may occur. Accordingly, a light characteristic deviation may occur between the light emitting elements LD. In particular, as an accumulated light emission amount (accumulated light emission luminance and emission time) of the light emitting element LD increases, that is, as an amount of a driving current supplied to the light emitting element LD increases, the light characteristic deterioration of the light emitting element LD may worsen.

Accordingly, the timing controller 400 according to an embodiment may calculate compensated second image data DATA2 by calculating an on-pixel ratio OPR of the first image data DATA1 and gamma-correcting the first image data based on the OPR. Therefore, the light characteristic deviation may be prevented without a separate temperature sensor.

At this time, the OPR may be a ratio of the number of pixels 110 activated based on the first image data DATA1 to the number of pixels 110 included in the display panel 100. In other words, the OPR may be a ratio a driving amount according to the first image data DATA1 (that is, a driving amount when the pixels 110 are driven based on the first image data DATA1) to a maximum driving amount (that is, a driving amount when all of the pixels 110 are driven based on a maximum grayscale value).

The scan driver 200 may receive the scan control signal SCS from the timing controller 400. The scan driver 200 may generate the scan signal in response to the scan control signal SCS and supply the scan signal to the scan lines S1 to Sn. When the scan signal is supplied to the scan lines S1 to Sn, the pixels 110 may be selected in a horizontal line unit.

The data driver 300 may supply the data signal to the data lines D1, D2 . . . , and Dm in response to the data control signal DCS. The data signal supplied to the data lines D1, D2, . . . , and Dm may be supplied to the pixels 110 to which the scan signal is supplied. To this end, the data driver 300 may supply the data signal to the data lines D1, D2, . . . , and Dm to be synchronized with the scan signal. Then, the pixels 110 may emit light with a luminance corresponding to the received data signal.

Figure 3:
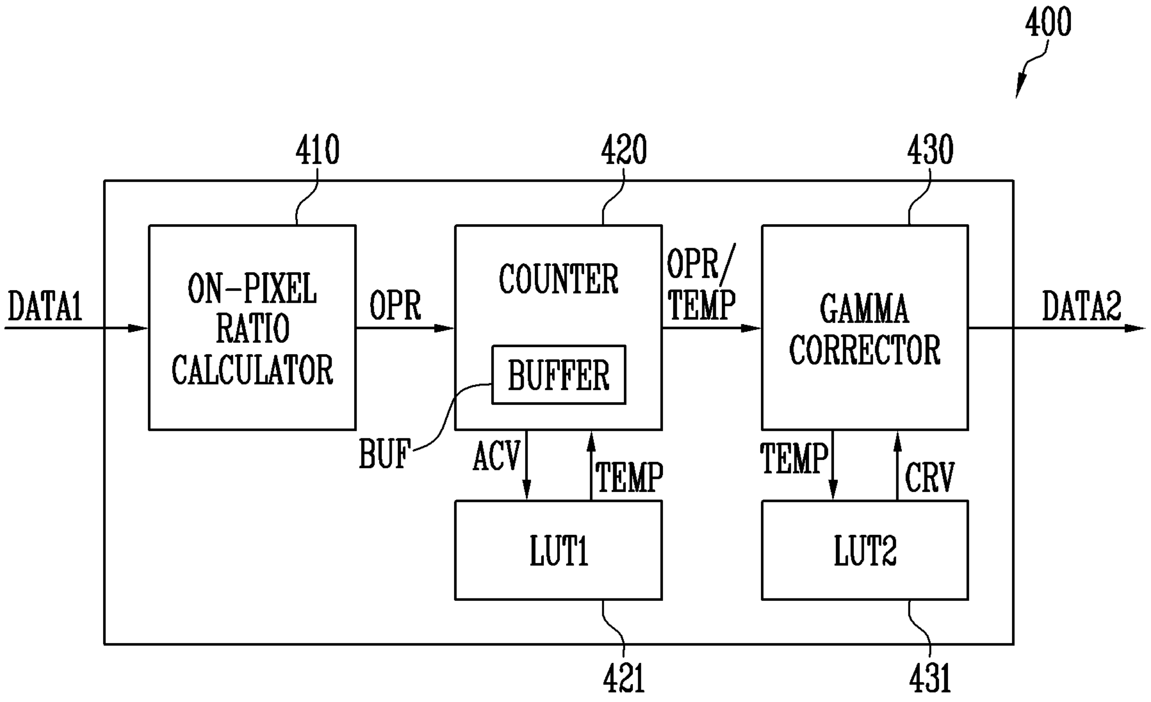
FIG. 3 is a diagram illustrating an embodiment of a timing controller shown in FIG. 1.
Figure 4A:
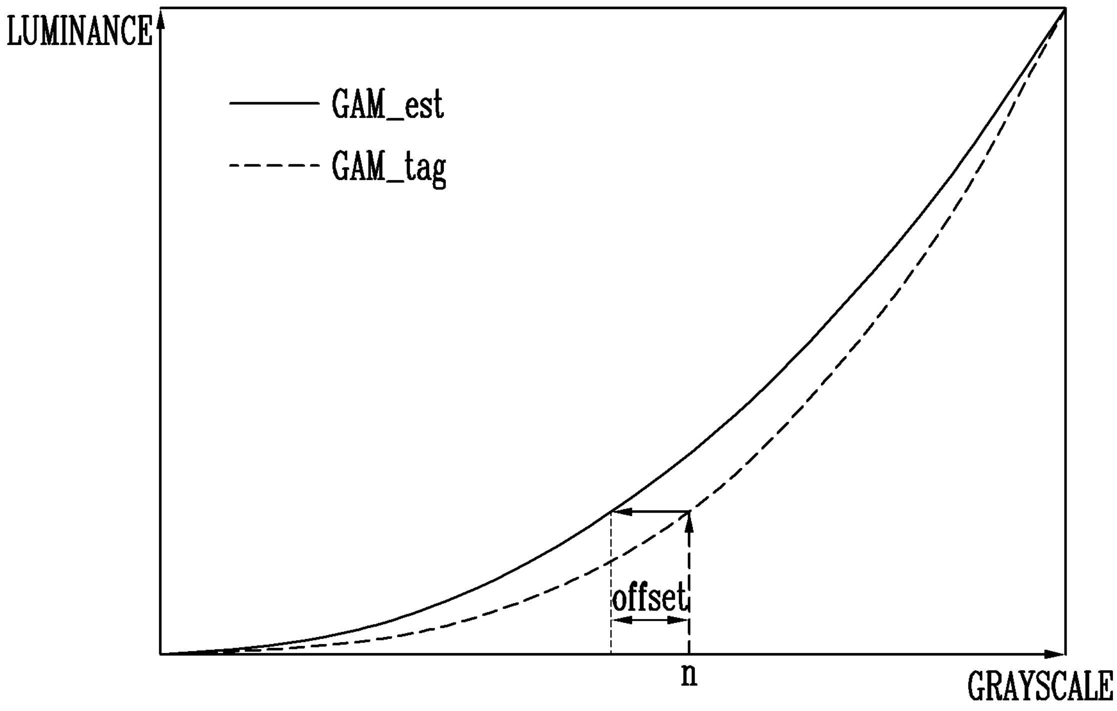
FIG. 4A is a graph illustrating a gamma corrector shown in FIG. 3.

FIG. 3 is a diagram illustrating an embodiment of the timing controller shown in FIG. 1. FIG. 4A is a graph illustrating a gamma corrector shown in FIG. 3. FIG. 4B is a second lookup table according to an embodiment.

Referring to FIG. 3, the timing controller 400 may include an on-pixel ratio calculator 410, a counter 420, a gamma corrector 430, a first lookup table 421, and a second lookup table 431. Meanwhile, in the present embodiment, all of the on-pixel ratio calculator 410, the counter 420, the gamma corrector 430, the first lookup table 421, and the second lookup table 431 are configured in the timing controller 400, but the disclosure is not limited thereto. That is, the on-pixel ratio calculator 410, the counter 420, the gamma corrector 430, the first lookup table 421, and the second lookup table 431 may be may be configured outside the timing controller 400, separately from the timing controller 400.

The on-pixel ratio calculator 410 may receive the first image data DATA1 and calculate the on-pixel ratio OPR by using the received first image data DATA1.

According to an embodiment, the on-pixel ratio calculator 410 may calculate the on-pixel ratio OPR by summing the first image data DATA1 for all light emitting pixels 110 of a corresponding frame and dividing a value obtained by summing by resolution (that is, a total number of the pixels 100 included in the display panel 100). For example, the first image data DATA1 and the on-pixel ratio OPR may be digital values.

According to an embodiment, the on-pixel ratio calculator 410 may individually calculate an on-pixel ratio OPR for first color (for example, red) sub-pixels, second color (for example, green) sub-pixels, and third color (for example, blue) sub-pixels, and supply the on-pixel ratio OPR to the counter 420. Alternatively, the on-pixel ratio calculator 410 may calculate an integrated on-pixel ratio OPR by totally summing the first image data DATA1 for sub-pixels of all colors, and supply the integrated on-pixel ratio OPR to the counter 420.

The counter 420 may receive the on-pixel ratio OPR, calculate temperature TEMP information of the display panel 100 using the received on-pixel ratio OPR, and provide the temperature TEMP information to the gamma corrector 430.

The counter 420 may receive the on-pixel ratio OPR and calculate an accumulated value ACV using the received on-pixel ratio OPR. According to an embodiment, the counter 420 may calculate the accumulated value ACV by summing the on-pixel ratio OPR for each frame during a preset period. At this time, the preset period may mean a period sufficient to require gamma correction for the first image data DATA1 due to a significant change of the temperature of the display panel 100, and may be determined experimentally for each model of the display device 1000.

The on-pixel ratio OPR may have a value between 0 (that is, all pixels 110 included in the display panel 100 are in an inactive state) and 100 (that is, all pixels 110 included in the display panel 100 are in an active state). The counter 420 according to an embodiment may assign a preset count number to the on-pixel ratio OPR having a value between 0 and 100 for each predetermined interval unit (for example, 1 unit). The counter 420 may calculate the accumulated value ACV by summing the number of counts during a preset period. For example, the counter 420 may assign a count number of 0 when the on-pixel ratio OPR is 100, and assign a count number of 0.5 when the on-pixel ratio OPR is 50. A count number for the remaining on-pixel ratio OPR may be applied in proportion to the on-pixel ratio OPR at a value between 0 and 1. That is, when the on-pixel ratio OPR is 25, the count number may be 0.25, and when the on-pixel ratio OPR is 75, the count number may be 0.75.

The counter 420 according to an embodiment may store the accumulated value ACV in a buffer BUF. The counter 420 may initialize the accumulated value ACV when the display device 1000 is powered off or when the first image data DATA1 corresponds to a black pattern. In addition, when the accumulated value ACV corresponds to a preset maximum value, the counter 420 may stop a count of the on-pixel ratio OPR.

The counter 420 may estimate (or determine) a temperature TEMP of the display panel 100 based on the accumulated value ACV. The counter 420 according to an embodiment may receive the temperature TEMP information of the display panel 100 corresponding to the accumulated value ACV from the first lookup table 421. The first lookup table 421 may include the temperature TEMP information of the display panel 100 corresponding to the accumulated value ACV. At this time, the temperature TEMP of the display panel 100 may increase linearly or non-linearly in response to the accumulated value ACV. For example, when the accumulated value ACV is 200, the temperature TEMP of the display panel 100 may corresponds to 30° C., and when the accumulated value ACV is 1000, the temperature TEMP of the display panel 100 may correspond to 40° C. However, the accumulated value ACV and the temperature TEMP of the display panel 100 are merely examples for convenience of description, and are not limited thereto.

In FIG. 3, the on-pixel ratio OPR is provided to the gamma corrector 430 via the counter 420, but the disclosure is not limited thereto. For example, the on-pixel ratio OPR may be provided to the gamma corrector 430 directly from the on-pixel ratio calculator 410.

The gamma corrector 430 may gamma-correct the first image data DATA1 using the received on-pixel ratio OPR and the temperature TEMP information of the display panel 100. In addition, the gamma corrector 430 may provide the second image data DATA2 in which the first image data DATA1 is gamma-corrected to the data driver 300.

The gamma corrector 430 may vary a luminance of the first image data DATA1 and a color coordinate of the first image data DATA1 so that the luminance of the first image data DATA1 and the color coordinate of the first image data DATA1 are close to a target luminance and a target color coordinate at a specific temperature, using the received on-pixel ratio OPR and temperature TEMP information of the display panel 100. According to an embodiment, the gamma corrector 430 may vary the luminance of the first image data DATA1 and the color coordinate of the first image data DATA1 in a method of changing a grayscale value of the first image data DATA1.

The gamma corrector 430 may calculate gamma correction data CRV using the received temperature TEMP information of the display panel 100. The gamma corrector 430 according to an embodiment may receive the gamma correction data CRV corresponding to the temperature TEMP information of the display panel 100 from the second lookup table 431.

Referring to FIG. 4A, a gamma correction value offset of n grayscale may be calculated using an expected gamma curve GAM_est and a target gamma curve GAM_tag for a specific temperature. For example, at 30° C., a luminance of the expected gamma curve GAM_est for the same grayscale may be generally greater than a luminance of the target gamma curve GAM_tag. Therefore, a grayscale is required to be lowered by the gamma correction value offset from the n grayscale so that the luminance of the expected gamma curve GAM_est for the n grayscale is equal to the luminance of the target gamma curve GAM_tag at 30° C.

Referring to FIG. 4B, red, green, and blue gamma correction values ΔRGn, ΔGGn, and ΔBGn of the n grayscale may be calculated based on the gamma correction value offset of the n grayscale. The red, green, and blue gamma correction values ΔRGn, ΔGGn, and ΔBGn may be added to the n grayscale and may be calculated as red, green and blue gamma correction data n+ΔRGn, n+ΔGGn, and n+ΔBGn of the n grayscale. The calculated red, green, and blue gamma correction data n+ΔRGn, n+ΔGGn, and n+ΔBGn may be stored in a form of a lookup table for the n grayscale.

The second lookup table 431 according to an embodiment may include the gamma correction data CRV, or Rc, Gc, and Bc corresponding to the grayscale for each temperature TEMP of the display panel 100.

The second lookup table 431 according to an embodiment may include the gamma correction data CRV, or Rc, Gc, and Bc corresponding to the grayscale for each dimming level of the display panel 100. In addition, the second lookup table 431 may include the gamma correction data CRV, or Rc, Gc, and Bc corresponding to the grayscale for each driving range of the pixel 110.

The gamma corrector 430 may receive the gamma correction data CRV, or Rc, Gc, and Bc corresponding to the specific temperature from the second lookup table 431. The gamma corrector 430 may provide the gamma correction data CRV, or Rc, Gc, and Bc to the data driver 300 as the second image data DATA2.

Meanwhile, the data driver 300 of FIG. 1 may generate the data signal based on the second image data DATA2 and output the data signal to the data lines D1 to Dm. The data signal may be input to the pixels 110 of a horizontal line selected by the scan signal. Then, the pixels 110 may emit light with the luminance corresponding to the received data signal. Accordingly, an image corresponding to the second image data DATA2 may be displayed on the display panel 100.

Therefore, the display device 1000 according to the disclosure may prevent a light characteristic deviation by estimating the temperature of the display panel 100 using the OPR of the first image data DATA1 and gamma-correcting the first image data DATA1 based on the estimated temperature.

Figure 5:
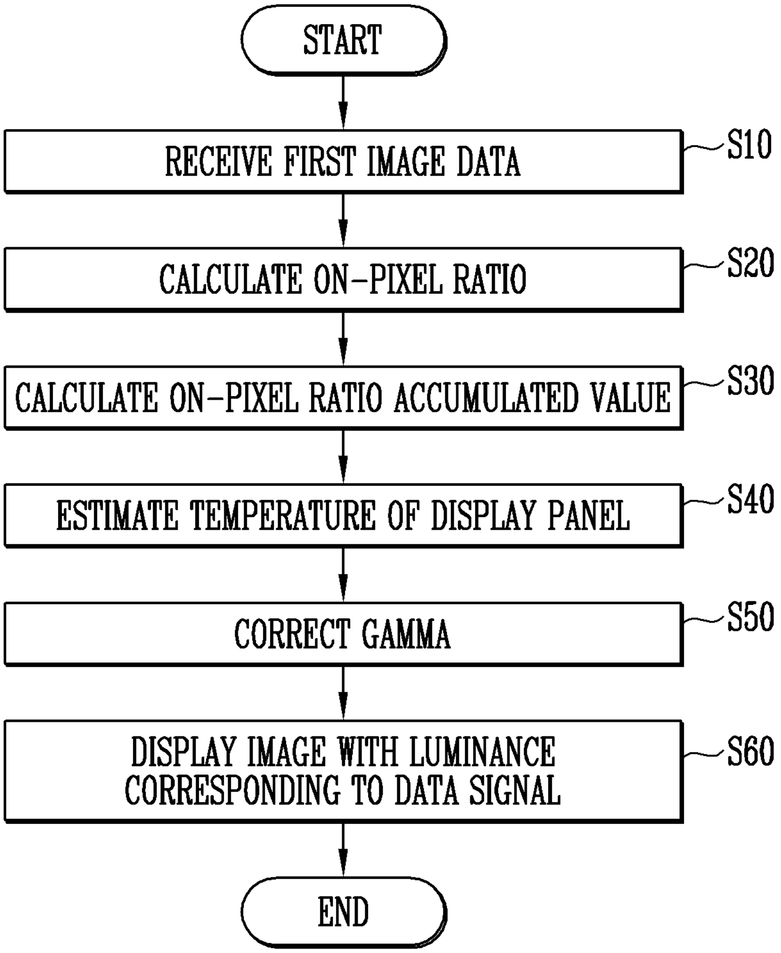
FIG. 5 is a flowchart illustrating a method of driving a display device according to an embodiment of the disclosure.

FIG. 5 is a flowchart illustrating a method of driving a display device according to an embodiment of the disclosure.

First, when the first image data DATA1 is supplied to the timing controller 400, the first image data DATA1 may be input to the on-pixel ratio calculator 410 (S10).

The on-pixel ratio calculator 410 may calculate the on-pixel ratio OPR according to the first image data DATA1 (S20).

According to an embodiment, the on-pixel ratio calculator 410 may calculate the on-pixel ratio OPR for each color by summing input data of sub-pixels for each color and dividing the value obtained by summing by the number of the corresponding sub-pixels to calculate an average emission ratio. In this case, according to an embodiment, the on-pixel ratio OPR of the red sub-pixels, the on-pixel ratio OPR of the green sub-pixels, and the on-pixel ratio OPR of the blue sub-pixels may be calculated.

Meanwhile, the on-pixel ratio calculator 410 may calculate an integrated on-pixel ratio OPR by averaging the input data of the sub-pixels for all colors without dividing the sub-pixels for each color.

The on-pixel ratio OPR calculated by the on-pixel ratio calculator 410 may be provided to the counter 420.

The counter 420 may receive the on-pixel ratio OPR and calculate the accumulated value ACV using the received on-pixel ratio OPR (S30).

According to an embodiment, the counter 420 may calculate the accumulated value ACV by summing the on-pixel ratio OPR for each frame during a preset period. At this time, the preset period may mean a period sufficient to require gamma correction for the first image data DATA1 due to a significant change of the temperature of the display panel 100, and may be determined experimentally for each model of the display device 1000.

The counter 420 may estimate the temperature TEMP of the display panel 100 based on the accumulated value ACV (S40).

The counter 420 according to an embodiment may receive the temperature TEMP information of the display panel 100 corresponding to the accumulated value ACV from the first lookup table 421. The first lookup table 421 may include the temperature TEMP information of the display panel 100 corresponding to the accumulated value ACV. At this time, the temperature TEMP of the display panel 100 may increase linearly or non-linearly in response to the accumulated value ACV.

The gamma corrector 430 may gamma-correct the first image data DATA1 using the received on-pixel ratio OPR and the temperature TEMP information of the display panel 100 (S50).

The gamma corrector 430 according to an embodiment may vary the luminance of the first image data DATA1 and the color coordinate of the first image data DATA1 so that the luminance of the first image data DATA1 and the color coordinate of the first image data DATA1 are close to the target luminance and the target color coordinate at a specific temperature, using the received on-pixel ratio OPR and temperature TEMP information of the display panel 100. According to an embodiment, the gamma corrector 430 may vary the luminance of the first image data DATA1 and the color coordinate of the first image data DATA1 in a method of changing a grayscale value of the first image data DATA1.

The gamma corrector 430 may calculate the gamma correction data CRV using the received temperature TEMP information of the display panel 100. The gamma corrector 430 according to an embodiment may receive the gamma correction data CRV corresponding to the temperature TEMP information of the display panel 100 from the second lookup table 431.

The data signal output to the data lines D1 to Dm may be input to the pixels 110 of the horizontal line selected by the scan signal. Then, the pixels 110 may emit light with the luminance corresponding to the received data signal. Accordingly, the image corresponding to the second image data DATA2 may be displayed on the display panel 100 (S60).

Although the disclosure has been described with reference to the embodiments thereof, it will be understood by those skilled in the art that the disclosure may be variously modified and changed without departing from the spirit and scope of the following claims.

What is claimed is:

1. A display device comprising:

a display panel including a plurality of pixels;

a timing controller configured to calculate an on-pixel ratio of first image data and correct the first image data into second image data based on the on-pixel ratio; and a data driver configured to generate a data signal based on the second image data and provide the data signal to the pixels, wherein the timing controller calculates the second image data by estimating a temperature of the display panel using the on-pixel ratio and gamma-correcting the first image data in response to the temperature, wherein the timing controller comprises a counter configured to calculate an accumulated value by counting the on-pixel ratio, and wherein the counter includes a buffer that stores the accumulated value, and initializes the accumulated value stored in the buffer when a black pattern is included in the first image data or when power is turned off.

2. The display device according to claim 1, wherein the on-pixel ratio is a ratio of the number of pixels activated based on the first image data to the total number of the pixels included in the display panel.

3. The display device according to claim 1, wherein the timing controller further comprises:

an on-pixel ratio calculator configured to calculate the on-pixel ratio using the first image data.

4. The display device according to claim 1, wherein the counter calculates the accumulated value by summing the on-pixel ratio for each frame during a preset period.

5. The display device according to claim 1, wherein the counter stops a count of the on-pixel ratio when the accumulated value corresponds to a preset maximum value.

6. The display device according to claim 1, wherein the counter estimates the temperature of the display panel corresponding to the accumulated value by using a first lookup table.

7. The display device according to claim 6, wherein the first lookup table includes temperatures of the display panel corresponding to the accumulated value, and the temperature of the display panel increases linearly or non-linearly in response to the accumulated value.

8. The display device according to claim 1, wherein the timing controller includes a gamma corrector configured to calculate the second image data by using a second lookup table.

9. The display device according to claim 8, wherein the second lookup table includes gamma correction data corresponding to a grayscale for each temperature of the display panel.

10. The display device according to claim 8, wherein the gamma corrector varies a luminance of the first image data and a color coordinate of the first image data so that the luminance of the first image data and the color coordinate of the first image data are close to a target luminance and a target color coordinate at a specific temperature.

11. A method of driving a display device comprising a display panel that includes a plurality of pixels, a timing controller configured to receive first image data and output corrected second image data, and a data driver configured to generate a data signal based on the second image data and provide the data signal to the pixels, the method comprising:

calculating an on-pixel ratio using the first image data;

calculating an accumulated value by counting the on-pixel ratio;

estimating a temperature of the display panel based on the accumulated value; and calculating the second image data by gamma-correcting the first image data according to the temperature of the display panel, wherein calculating the accumulated value further comprises initializing the accumulated value when a black pattern is included in the first image data or when power is turned off.

12. The method according to claim 11, wherein the on-pixel ratio is a ratio of the number of pixels activated based on the first image data to the total number of the pixels included in the display panel.

13. The method according to claim 11, wherein calculating the accumulated value comprises calculating the accumulated value by summing the on-pixel ratio for each frame during a preset period.

14. The method according to claim 11, wherein estimating the temperature of the display panel comprises using a first lookup table, the first lookup table includes temperatures of the display panel corresponding to the accumulated value, and the temperature of the display panel increases linearly or non-linearly in response to the accumulated value.

15. The method according to claim 11, wherein calculating the second image data comprises using a second lookup table, and the second lookup table includes gamma correction data corresponding to a grayscale for each temperature of the display panel.

16. A method of driving a display device comprising a display panel that includes a plurality of pixels, a timing controller configured to receive first image data and output corrected second image data, and a data driver configured to generate a data signal based on the second image data and provide the data signal to the pixels, the method comprising:

calculating an on-pixel ratio using the first image data;

calculating an accumulated value by counting the on-pixel ratio;

estimating a temperature of the display panel based on the accumulated value; and calculating the second image data by gamma-correcting the first image data according to the temperature of the display panel, wherein calculating the accumulated value further comprises stopping a count of the on-pixel ratio when the accumulated value corresponds to a preset maximum value.

* * * * *